(12) United States Patent
Falk et al.

(10) Patent No.: US 11,809,598 B2
(45) Date of Patent: Nov. 7, 2023

(54) DEVICES AND METHODS FOR SAFE STORAGE OF MEDIA CONTAINING PERSONAL DATA AND ERASURE OF STORED PERSONAL DATA

(71) Applicant: Axis AB, Lund (SE)

(72) Inventors: Daniel Falk, Lund (SE); Ralph Berger Torres, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/591,656

(22) Filed: Feb. 3, 2022

(65) Prior Publication Data
US 2022/0261499 A1 Aug. 18, 2022

(30) Foreign Application Priority Data
Feb. 9, 2021 (EP) .................................... 21155892

(51) Int. Cl.
*G06F 21/62* (2013.01)
(52) U.S. Cl.
CPC ................. *G06F 21/6254* (2013.01)
(58) Field of Classification Search
CPC .................................................. G06F 21/6254
See application file for complete search history.

(56) References Cited

U.S. PATENT DOCUMENTS

| 8,898,164 | B1 * | 11/2014 | Feldman ............ G06Q 30/0269 707/736 |
| 10,531,038 | B2 | 1/2020 | Farrell et al. |
| 11,423,175 | B1 * | 8/2022 | Mahajan ................. G06T 5/002 |
| 11,455,359 | B2 * | 9/2022 | Westmoreland ...... H04L 67/146 |

(Continued)

FOREIGN PATENT DOCUMENTS

| CN | 110446105 A | 11/2019 |
| CN | 112262388 A | 1/2021 |

(Continued)

OTHER PUBLICATIONS

Extended European Search Report dated Jul. 14, 2021 for European Patent Application No. 21155892.9.

(Continued)

*Primary Examiner* — Stephen T Gundry
(74) *Attorney, Agent, or Firm* — Volpe Koenig

(57) ABSTRACT

A method for storing a file containing personal data comprises obtaining a temporary anonymous identifier (AnonID.m) of a person, which temporary anonymous identifier (AnonID.m) is dependent on a token (FileID.m) of the file; extracting personal data items from the file associated with the person; for each personal data item, generating a locator (Loc.m.n), which allows the personal data item to be reinstated into the file, and an item-specific anonymous identifier (AnonID.m.n) of the person, wherein the item-specific anonymous identifier is generated by applying a predefined one-way function to a combination of the temporary anonymous identifier (AnonID.m) and an identifier (n) of the personal data item; storing each personal data item together with the locator and the item-specific anonymous identifier in a first memory; and storing an anonymized version of the file without the personal data items in a second memory.

15 Claims, 5 Drawing Sheets

(56) References Cited

U.S. PATENT DOCUMENTS

| | | | |
|---|---|---|---|
| 11,514,188 B1* | 11/2022 | Jassal | G06N 20/00 |
| 2018/0144036 A1* | 5/2018 | Kramer | G06F 21/6254 |
| 2019/0303610 A1* | 10/2019 | Bodegas Martinez | G06F 16/152 |
| 2019/0340385 A1* | 11/2019 | Alsina | G06F 21/602 |
| 2019/0377900 A1* | 12/2019 | Balzer | G06F 21/6254 |
| 2019/0377901 A1 | 12/2019 | Balzer et al. | |
| 2020/0110900 A1* | 4/2020 | Abdi Taghi Abad | G06F 16/907 |
| 2020/0184103 A1 | 6/2020 | Matusek et al. | |
| 2020/0278934 A1* | 9/2020 | Hillier | G06F 21/6254 |
| 2020/0311303 A1 | 10/2020 | Wang | |
| 2021/0209252 A1* | 7/2021 | Reilly | G06F 40/143 |
| 2021/0266297 A1* | 8/2021 | Troitsky | H04L 63/0421 |
| 2021/0288967 A1* | 9/2021 | Lof | G06F 21/10 |
| 2021/0326470 A1* | 10/2021 | Fleck | G06F 21/6254 |
| 2021/0390196 A1* | 12/2021 | Lavine | G06F 21/6218 |
| 2022/0138347 A1* | 5/2022 | McDonagh | A61B 5/7275 705/2 |
| 2022/0182235 A1* | 6/2022 | Tysor | G06F 16/90335 |
| 2022/0191005 A1* | 6/2022 | D'Amore | H04L 9/3297 |
| 2022/0200992 A1* | 6/2022 | Ortiz | H04L 9/30 |
| 2022/0222373 A1* | 7/2022 | Villax | G06F 21/6254 |
| 2022/0277103 A1* | 9/2022 | Brannon | G06F 21/6245 |
| 2022/0353085 A1* | 11/2022 | Abadir | H04L 9/0894 |
| 2022/0358216 A1* | 11/2022 | Qi | G06F 21/554 |
| 2022/0405737 A1* | 12/2022 | McCauley | G06Q 20/3223 |
| 2023/0043544 A1* | 2/2023 | Fleck | G06F 21/6245 |

FOREIGN PATENT DOCUMENTS

| | | |
|---|---|---|
| WO | 2019/245680 A1 | 12/2019 |
| WO | 2020/051193 A1 | 3/2020 |

OTHER PUBLICATIONS

Chinese Office Action dated Jun. 30, 2023 for Chinese Patent Application No. 202210114247.0.

* cited by examiner

DEVICES AND METHODS FOR SAFE STORAGE OF MEDIA CONTAINING PERSONAL DATA AND ERASURE OF STORED PERSONAL DATA

FIELD OF INVENTION

The present disclosure relates to technology for safely storing and regenerating media containing personal data and reliably erasing such personal data on request.

TECHNICAL BACKGROUND

The present disclosure addresses storage of media containing a mixture of personal data and other data, and especially seeks to propose such technology that fulfills privacy safeguards of the character laid down in legal instruments such as the Regulation (EU) 2016/679 on the protection of natural persons with regard to the processing of personal data and on the free movement of such data (General Data Protection Regulation, GDPR), the China Cyber Security Law, the California Consumer Privacy Act and other U.S. federal and state law. Under the GDPR, each person shall have a right at any time to request the complete deletion of his or her stored personal data. This is referred to as the data subject's right to erasure, or 'right to be forgotten'. In existing technology, however, the right to be forgotten may not be compatible with data version control, a near-indispensable tool for managing large datasets and over an extended time.

A particular complication arises in connection with the storage of non-discrete media, such as text, image, and video data. In one scenario, a person (data subject), who has previously given a company (data recipient) her consent to store a video where she appears in a small fraction of the frames, contacts the data recipient with a request to have her personal data erased. While the data recipient is entitled in principle to keep all frames but those where the person appears, the storing of personal identifiers for each video frame would be highly problematic from a data protection perspective. This is because the storing of identified personal data, with higher associated privacy risks, would require technical arrangements to ensure a higher safety level, which may be practically unwieldy. To meet the person's request for erasure, therefore, the data recipient is left with the option of blindly deleting the full video sequence, which represents a massive and unjustified loss of useful data.

SUMMARY

One aspect of the present disclosure is to make available methods and devices for storing a file containing personal data in such manner that a data subject's request for erasure of her personal data can be carried out without unnecessarily deleting other data contained in the file. Another aspect is to ensure that the file with the personal data is stored safely until such a request for erasure is made, yet in a form that lends itself to efficient management and processing. A particular safety aspect to be addressed by the present disclosure is to prevent a party who gains unauthorized access to the stored personal data from identifying the data subject (person) to which it belongs. A particular efficiency aspect is to allow version control. Another aspect of the present disclosure is to make available methods and devices for efficient reestablishment of a file with personal data that has undergone safe storage using the techniques proposed herein.

These and other aspects are achieved by the details set forth herein according to the independent claims. The dependent claims relate to advantageous embodiments.

In a first aspect, there is provided a method for storing a file containing personal data, the method comprising: obtaining a temporary anonymous identifier (AnonID.m) of a person which temporary anonymous identifier (AnonID.m) is dependent on a token (FileID.m) of the file; from the file, extracting personal data items associated with the person; for each personal data item, generating a locator (Loc.m.n), which allows the personal data item to be reinstated into the file, and an item-specific anonymous identifier (AnonID.m.n) of the person, wherein the item-specific anonymous identifier is generated by applying a predefined one-way function to a combination of the temporary anonymous identifier (AnonID.m) and an identifier (n) of the personal data item; storing each personal data item together with the locator and the item-specific anonymous identifier in a first memory; and storing an anonymized version of the file without the personal data items in a second memory.

Because the item-specific anonymous identifiers are generated using a one-way function, a party gaining unauthorized access to the first memory cannot easily attribute the stored personal data items to the person. There is also no way for the unauthorized party to gather all personal data items that are associated with the same person. This may be considered a form of pseudonymization of the file. Because the file is anonymized before being stored in the second memory, this memory may be subject to less strict safety requirement than the first memory. Because the person is identified by a temporary anonymous identifier, the data recipient can carry out the method for storing the file without asking the person to share a non-anonymous identifier of herself. Finally, because each personal data item is stored together with the item-specific anonymous identifier, exhaustive and precise deletion of all items relating to a specific person is possible on request.

In a second aspect, there is provided a method for erasing personal data associated with a person from a first memory, which stores personal data items together with corresponding locators (Loc.m.n) and item-specific anonymous identifiers (AnonID.m.n) of persons associated with the personal data items, the method comprising: obtaining a private identifier (PrivID) of the person; obtaining tokens (FileID.m) of all files from which the personal data items may have been extracted; for each one of the files, obtaining identifiers (n) of all personal data items which are associated with the person and may have been extracted from the file; generating temporary anonymous identifiers (AnonID.m) of the person by applying a predefined one-way function to combinations of the obtained private identifier (PrivID) and the obtained file tokens (FileID.m); for each generated temporary anonymous identifier (AnonID.m) of the person, generating item-specific anonymous identifiers (AnonID.m.n) of the person by applying the predefined one-way function to combinations of the temporary anonymous identifier (AnonID.m) and the obtained identifiers (n) of the personal data items; and erasing all personal data items from the first memory which match any of the generated item-specific anonymous identifiers (AnonID.m.n) of the person.

The fact that each personal data item is stored together with the item-specific anonymous identifier makes it possible to locate and erase all items relating to a specific person exhaustively and precisely. The erasing method according to the second aspect does not need to modify or delete any anonymized versions of the files from which the personal data items have been extracted. This leaves the data recipient free to decide how and to what extent the file is to be salvaged after the erasure of the person's personal data items. The data recipient may decide to reconstruct and use a subset of the file after the erasure, in accordance with the degree of granularity that is suitable for the type of data concerned and the use case at hand. To mention a few examples, after erasure of a person's face from an image, a cropped version of the image may be retained for further use; after erasure of a person's face from certain frames in a video sequence, all remaining video frames—or continuous video sub-sequences of at least N remaining frames each—may be retained; after erasure of a person's name from a database row, the other rows of the database may be retained; after erasure of a person's credentials from a document, the other sections of the document may be retained etc. The erasing method in itself does not introduce any significant technical limitations on the salvaging of the file. Finally, to verify that an execution of this method has completely erased all personal data associated with the person, it is enough to establish that none of the generated item-specific anonymous identifiers matches any of the personal data items that remain stored in the first memory.

In a third aspect, there is provided a method for reinstating personal data into a file, the method comprising: from a first memory storing personal data items, which have been extracted from files, together with corresponding locators (Loc.m.n) and item-specific anonymous identifiers (Anon-ID.m.n) of persons associated with the personal data items, retrieving those personal data items which have been extracted from said file and corresponding locators; from a second memory, retrieving an anonymized version of the file without the personal data items; and reinstating the personal data items into the anonymized version in accordance with the corresponding locators.

Because the personal data items are stored together with corresponding locators and item-specific anonymous identifiers, the personal data items can be correctly reinstated into the anonymized version of the file without jeopardizing the privacy of the persons associated therewith. The reinstatement method can be carried out by the data recipient without requiring the person to share a non-anonymous identifier of herself. Further, because the reinstatement method uses the anonymized version of the file as input, the method will execute robustly even when some or all of the personal data have been erased from the first memory, e.g., on request by the associated person. In that case, more precisely, the method may be implemented robustly in such manner that it terminates to return a usable (consistent, readable, editable etc.) file version, on which the portions from which the erased personal data items were erased have no corrupting effect.

When used together, the three aspects form a data storage ecosystem with privacy by design.

There is further provided a device communicatively connected to first and second memories and comprising processing circuitry that is arranged to perform the method of the first, second or third aspect. The embodiments moreover relate to a computer program containing instructions for causing a computer, or this device in particular, to carry out the method of the first, second or third aspect. The computer program may be stored or distributed on a data carrier. As used herein, a "data carrier" may be a transitory data carrier, such as modulated electromagnetic or optical waves, or a non-transitory data carrier. Non-transitory data carriers include volatile and nonvolatile memories, such as permanent and non-permanent storage media of magnetic, optical or solid-state type. Still within the scope of "data carrier", such memories may be fixedly mounted or portable.

In the present disclosure, "file" is used in the broad sense, to refer to any independently storable and/or processable data set in a file system, including a database, file archive or other data storage context. In the interest of avoiding unnecessary removal of data in response to a request for erasure, a data recipient will normally want to handle media containing personal data in as small chunks as practicable, i.e., usually in a per-file manner. The present embodiments are in line with this aspiration inasmuch as it allows not only files but subsets of a file to be salvaged after a person's personal data has been erased. Revisiting the examples listed above, a file may for instance correspond to an image, a video sequence, a database, or a document.

The present disclosure endeavors to use the terms "personal data", "data subject" (i.e., a natural person), "data recipient" (i.e., a party to which personal data is at least disclosed) and "pseudonymization" consistently with their meaning in the GDPR. Accordingly, a "personal data item" is an item of "personal data", such as an area of an image containing a person's face, a video frame in which the license plate of a privately owned car is visible, a database row containing a person's name, or a section of a document containing a person's credentials.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Storing a File Containing Personal Data

Figure 1:
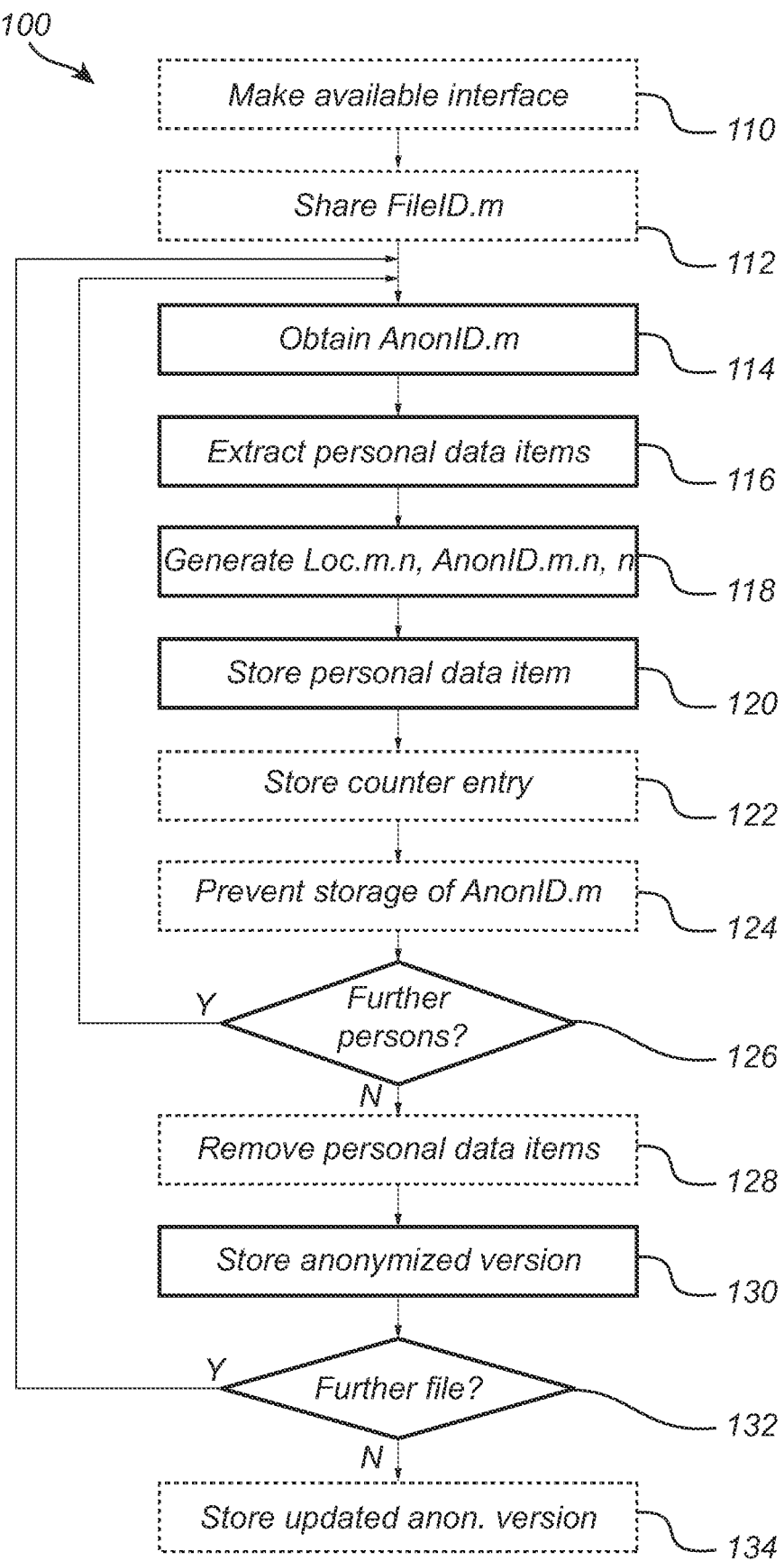
FIG. 1 is a flowchart of a method for storing a file containing personal data.

FIG. 1 illustrates a method 100 for storing a file containing personal data. The method 100 may be performed by or on behalf of a data recipient, a natural or legal person which has received or generated the file and has further obtained a person's consent to store her personal data in the file. The consent may cover not only personal data in the file to be stored but additional files as well. The method 100 has been conceived to handle the scenario where the person revokes her consent; the revocation may be equivalent to a request to have the person's personal data completely erased.

In an initial optional step 110, a one-way function interface (cf. FIG. 4, elements 490) configured with a predefined one-way function is made available to a person to allow her to generate a temporary anonymous identifier (AnonID.m) on the basis of a combination of a private identifier (PrivID) and a token (FileID.m) of the file to be stored. The one-way function interface is made available as locally installed software or an online interface laid out in such manner that the person can generate the temporary anonymous identifier (AnonID.m) without sharing the private identifier (PrivID) with the data recipient. Sharing of the private identifier (PrivID) may be necessary only if the person wishes to have her personal data erased, as explained below with reference to FIG. 2.

As the one-way function, implementations of the method 100 may use a hash function, in particular a cryptographic hash function that provides a safety level considered adequate in view of the sensitivity of the personal data to be stored. Two examples are SHA-256 and SHA3-512. The one-way function shall be predefined (e.g., it shall be reproducible) so that the temporary anonymous identifier (AnonID.m) can be regenerated when a request for erasure is to be carried out.

The one-way function interface made available to the person in step 110 may further allow the person to generate the private identifier (PrivID) on the basis of a personal identifier (ID). The personal identifier (ID) may be a civil or official identifier, such as an identity number, social security number, passport number, combination of name and birth date, etc., which the person can reconstruct without actively archiving it. If this advantage is not considered important, the person may feed the one-way function interface with an arbitrary bit pattern as the private identifier (PrivID), as long as the person is confident she can reproduce the bit pattern in connection with a future request for erasure and the bit pattern is reasonably hard for third parties to reproduce. The mapping from the personal identifier (ID) to the private identifier (PrivID) can be the same one-way function as is used to map the private identifier (PrivID) to the temporary anonymous identifier (AnonID.m); alternatively, a different one-way function can be used. Either way, unless the person has stored the private identifier (PrivID) reliably, she should ensure she has access to the same one-way function or one-way functions also in the future, to remain able to order erasure of her personal data.

The token (FileID.m) of the file to be stored is arbitrary as long as it is can be reconstructed based on information about the files stored in the second memory. The token (FileID.m) may be a running sequence number. To allow retroactive enumeration (e.g., when erasure has been requested) the token is preferably a discrete quantity. Example tokens include file creation date, media recording data, file size (of the anonymized version of the file), a size bin to which the file size belongs in a predefined set of size bins (e.g., size in MB in the ranges [0, 10), [10, 20), [20, 30), . . . ), a fingerprint/digest of the file content, a filename identifying the file in the file system etc. To carry out personal data erasure, the data recipient may retroactively obtain complete value sets of these tokens by querying a file system about all files stored in the second memory. If the file creation date is used as token, a complete value set corresponds to the data range over which file storage has been going on, which can for instance be read from a worklog, in a digital or non-digital format. While not essential to the embodiments, it is of some advantage to use a unique token for each file (i.e., an identifier), as this ensures there is no collision among item-specific anonymous identifiers (AnonID.m.n); alternatively, identical tokens (FileID.m) may be used for a cluster of multiple files that are stored at the same or at nearby points in time, so that no need arises to store the sensitive temporary anonymous identifier (AnonID.m). It is not advisable, however, to use a constant token for all files, as this will imply that all item-specific anonymous identifiers will belong to a common sequence and render efficient bookkeeping of the total quantity of personal data items stored impossible; such bookkeeping is of great convenience when complete erasure is requested.

If the token (FileID.m) of the file to be stored is unknown to the person—unlike, say, today's date—its value may be shared with the person or may be directly supplied to the one-way function interface, in a second optional step 112. The temporary anonymous identifier (AnonID.m) can then be correctly generated based on the combination of the private identifier (PrivID) and the token (FileID.m). The method 100 may include step 110 or step 112, the combination of both these steps or neither.

In a next step 114 of the method 100, a temporary anonymous identifier (AnonID.m) of the person is obtained. The temporary anonymous identifier (AnonID.m) varies with the token (FileID.m) of the file. A preferred way of obtaining the temporary anonymous identifier (AnonID.m) is to receive it from the person; in this manner, the person does not need to share the private or personal identifier with the data recipient executing the method 100.

In a step 116, personal data items associated with the person are extracted.

In a step 118, for each personal data item that has been extracted in step 116, a locator (Loc.m.n) and an item-specific anonymous identifier (AnonID.m.n) of the person are generated.

The locator (Loc.m.n) allows the personal data item to be reinstated into the file. Its structure may depend on the media type to which the file relates. If the personal data item is an area of an image, the locator (Loc.m.n) may indicate that area in the image, e.g., in terms of its bounding box coordinates. For video data, a locator allowing reinstatement of an extracted area corresponding to the person's face or her car's license plate in a frame may indicate a sequence number of the frame and image coordinates of the extracted area.

The item-specific anonymous identifier (AnonID.m.n) of the person is generated in step 118 by applying a predefined one-way function to a combination of the temporary anonymous identifier (AnonID.m) and an identifier (n) of the personal data item. The one-way function may be the same as the one used by the person to generate the temporary anonymous identifier (AnonID.m), or it may be a different one-way function with similar characteristics. The identifier (n) of the personal data item can be a file-specific sequence number, i.e., the sequence counter is reset for each new file to be stored or—as the case may be—for each cluster of files to be stored at the same time, so that each identifier is unique within its file (file cluster) but personal data items belonging to two different files (file clusters) may have identical identifiers. The identifier (n) may furthermore be a global sequence number, or it may be a complete identifier of the personal data item on the level of the operating system or another relevant namespace. Instead of a numerical counter, one may equivalently use an alphabetic counter or a counter taking values in any suitable discrete set or space. The counter may use a predefined enumeration (or incrementation) rule $n_{k+1}=f(n_k)$.

In a further development of the method 100, in which successive versions of a file can be stored, step 118 is repeated when a new version is to be stored, whereby the locators of the personal data items further depend on a version (or commit) v of the file, Loc.m.n.v. This supports the implementation of version control in the second memory.

Figure 5:
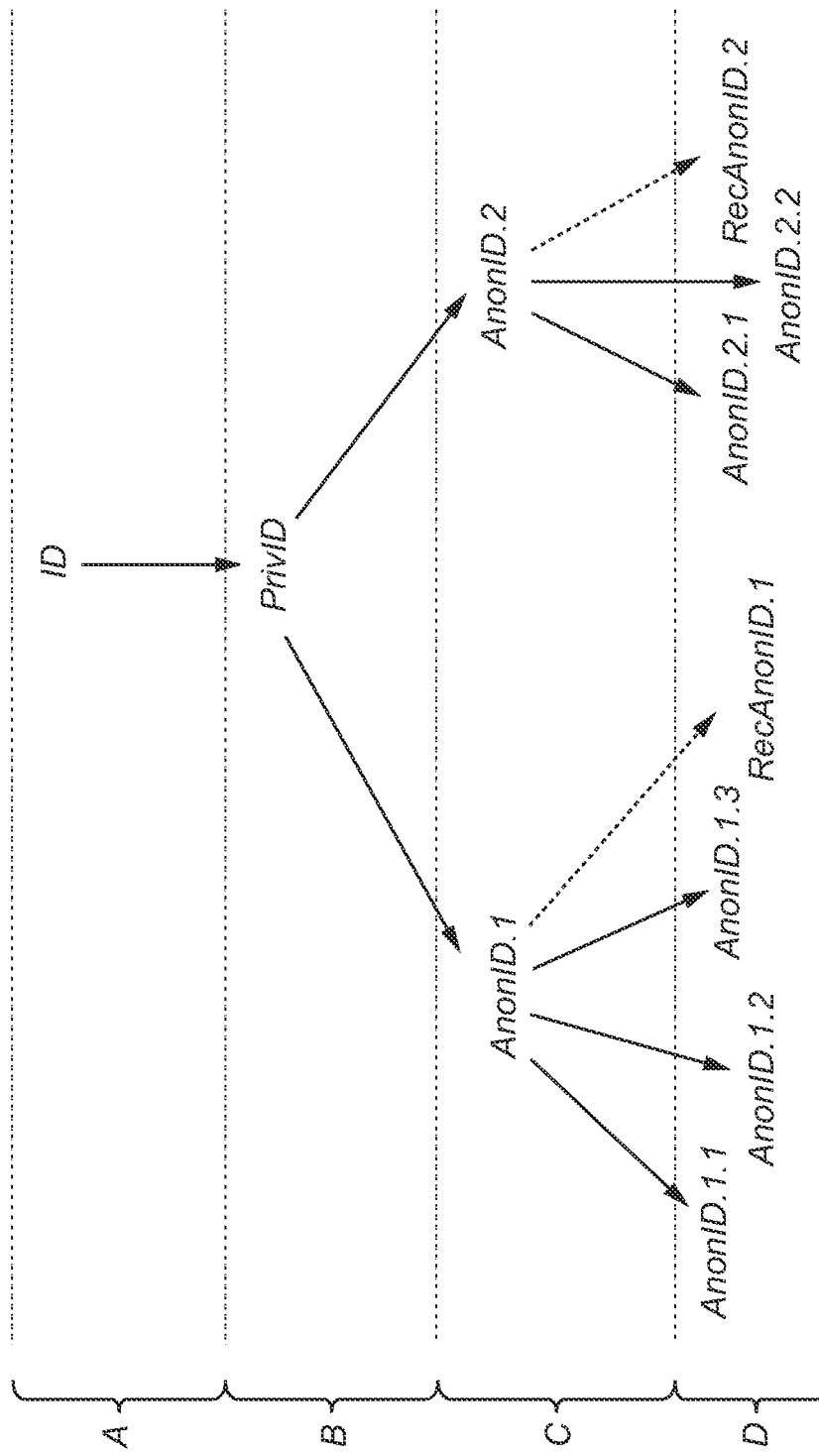
FIG. 5 shows a key derivation structure, in which each arrow represents a one-way mapping.

Reference is made to FIG. 5, which illustrates how the identifiers ID, PrivID, AnonID.m, AnonID.m.n are related. Each downward arrow corresponds to the application of a one-way function. The letters on the left-hand side of FIG. 5 further indicates what entity has access to the identifiers concerned.

A: The private identifier (ID) remains with the data subject; sharing with data recipient is never needed.

B: The data subject stores the private identifier (PrivID) until the consent to store personal data is to be revoked. At that point, the data subject shares the private identifier (PrivID) with the data recipient to allow the data recipient to erase her personal data according to the method 200.

C: The data subject's sharing of one of the temporary anonymous identifiers (AnonID.m) with the data recipient is equivalent to consenting to storage of the file with her personal data. The data recipient uses this identifier to carry out the storage of the file according to the method 100.

D: The data recipient stores item-specific anonymous identifiers (AnonID.m.n) in the first memory together with the extracted personal data items. To allow the data recipient to carry out a requested erasure of the personal data items according to the method 200, these identifiers cannot be deleted until the personal data items are.

Figure 4:
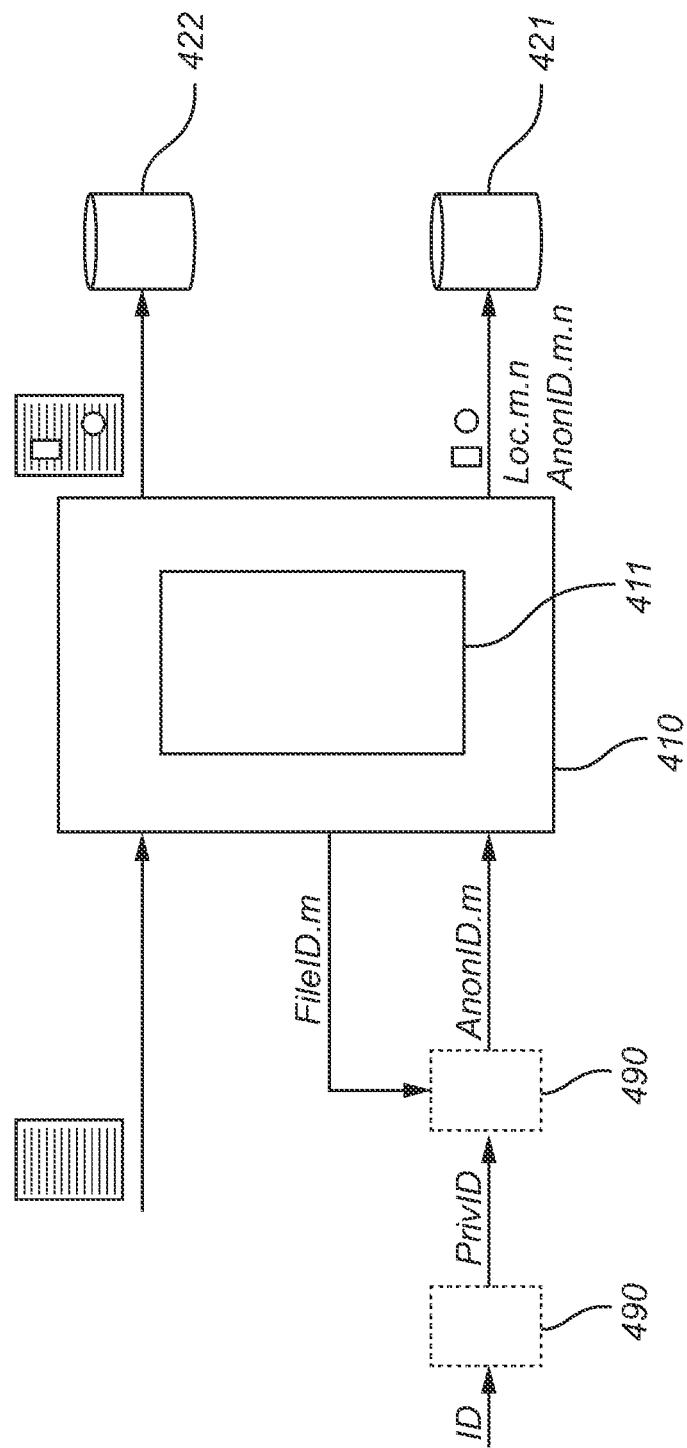
FIG. 4 is a functional block diagram of a device for performing at least the method illustrated in FIG. 1.

Returning to FIG. 1, the method 100 further comprises a step 120 in which each personal data item is stored together with the locator (Loc.m.n or Loc.m.n.v) and the item-specific anonymous identifier (AnonID.m.n) in a first memory (cf. FIG. 4, element 421). A relational database may be used for this storage operation, which may be visualized as a table with the following general appearance:

TABLE 1

Example data structure for first memory

| Locator | Personal data item | Item-specific anonymous identifier |
| --- | --- | --- |
| Loc.1.1 | First picture of the person's face | AnonID.1.1 |
| Loc.1.2 | Second picture of the person's face | AnonID.1.2 |
| ... | ... | ... |

In an optional step 122, a counter entry for the person is stored, e.g., in the first memory or elsewhere. The counter entry allows verification of the exhaustiveness of an enumeration of all personal data items associated with the person. To this end, the counter entry may indicate:

the total number of personal data items, in which case the erasing method applies a pre-agreed enumeration rule and a begin rule,
the first and last personal data item (e.g., in terms of their item-specific anonymous identifiers, AnonID.m.n, or in terms of their locators, Loc.m.n), in which case the erasing method applies an enumeration rule,
a list of all the personal data items, in which case the erasing method can be agnostic, or
a list of the locations of all the personal data items or their locations, in which case the erasing method can be agnostic.

Preferably, one counter entry is stored for each file which contains personal data of the person or for each new file token (FileID.m) that is used.

In some embodiments, the counter entry includes a recognizable anonymous identifier (RecAnonID.m) of the person, which is generated by applying the one-way function to the temporary anonymous identifier (AnonID.m), as also indicated by the dashed arrows in FIG. 5. Since the recognizable anonymous identifier (RecAnonID.m) has been generated by means of a one-way function, it cannot be attributed to the person. The recognizable anonymous identifier (RecAnonID.m) does however allow, in connection with carrying out an erasure request, to verify that the counter entry of the correct person has been located. When the counter entry includes the recognizable anonymous identifier (RecAnonID.m), it may have the following structure:

TABLE 2

Example data structure for counter entry

| Recognizable anonymous identifier | Total number of personal data items |
| --- | --- |
| RecAnonID.1 | N1 |
| RecAnonID.2 | N2 |
| ... | ... |

This may be understood as follows: the file or files for which the token FileID.1 has been used contains exactly N1 personal data items associated with the person, the file or files for which the token FileID.2 has been used contains exactly N2 personal data items associated with the person, and so forth.

In a further optional step 124 of the method 100, action is taken to prevent non-volatile storage of the temporary anonymous identifier (AnonID.m). Such protection measures may include erasing the identifier in a runtime memory or overwriting it; alternatively, the first and second memories and any available further non-volatile memories are provided with a gatekeeper functionality rejecting storage of data having the datatype of the temporary anonymous identifier (AnonID.m). In this manner, if a new file is to be stored on the following day—assuming this period is too long to maintain the identifier in the runtime memory—it is necessary to obtain a new temporary anonymous identifier (AnonID.(m+1)), i.e., execute the step 114 anew.

At this point, in step 126, it is assessed whether the file to be stored contains personal data associated with any further person. If this is the case (Y branch), the execution loops back to carry out steps 114, 116, 118 and 120 (together with the optional steps 110 and 112, if included) for said further person. Accordingly, a temporary anonymous identifier (AnonID'.m) of the further person is obtained; personal data items associated with the further person are extracted; and a locator (Loc.m.n) and an item-specific anonymous identifier (AnonID'.m.n) of the further person are generated for each personal data item. It is noted that the locators of both persons may depend on an identifier (n) belonging to the same sequence.

If there are no further persons to consider for the file to be stored (N branch from step 126), the execution of the method 100 goes on to an optional step 128, in which the personal data items in the file are removed to obtain an anonymized (or censored) version of the file. The removal may be achieved by at least one of removing (deleting) the personal data item, abrogating possible recognition factors in the personal data item, concealing, redacting, masking, replacing, or overwriting the personal data item, or furthermore applying suitable filtering or image processing. Suitable filtering and image processing include those which impart a blurring, pixelating, deforming, or other effect tending to render the personal data unidentifiable. Such filtering or image processing is typically of the data-destructive type and will decrease the information content of the file.

In a subsequent step 130, the anonymized version of the file without the personal data items is stored in a second memory (cf. FIG. 4, element 422). The second memory may be the same memory as the first memory. However, in some embodiments, the second memory is different from the first memory.

Within step 130, the locators (Loc.m.n) of all extracted personal data items may optionally be stored together with the anonymized version of the file. In other words, this option means that the locators (Loc.m.n) are stored both in the first and the second memory. Access to a spare copy of the locators (Loc.m.n) is helpful when the file is to be reconstructed in a situation where some of the personal data which it originally contained has been erased and this erasure has been performed by deleting all rows of Table 1 associated with the requesting person, including the locators. The spare copy of the locators (Loc.m.n) then allows the corresponding locations to be marked as empty/modified/invalid despite the erasure. Alternatively, the same marking functionality can be implemented if the erasing operation preserves the locators (i.e., it leaves the first column of Table 1 intact).

This completes the storing of a first version of the file.

Optionally, the method 100 may extend to the storing of a second file, which also contains personal data associated with the person. The second file may be related to the first one by belonging to the same temporal, spatial or subject-matter context. For instance, the files may represent images acquired at consecutive points in time, or video sequences that succeed each other. The files may further relate to different subareas of an imaged space, which has been partitioned to obtain manageable file sizes, granularity or the like.

Accordingly, it is assessed in a step 132 whether a second file is to be stored, in which case (Y branch) the execution loops back, beginning at step 114. In this execution round, a second temporary anonymous identifier (AnonID.(m+1)) of the person is obtained, which temporary anonymous identifier (AnonID.(m+1)) is dependent on a token (FileID.(m+1)) of the second file. Personal data items associated with the person are extracted from the second file. For each extracted personal data item, a locator (Loc.(m+1).n) and an item-specific anonymous identifier (AnonID.(m+1).n) of the person are generated. Each personal data item is stored together with the locator and the item-specific anonymous identifier in the first memory. Finally, an anonymized version of the second file without the personal data items is stored in the second memory.

If no more files are to be stored (N branch from step 132), the execution of the method 100 can terminate.

In an optional additional step 134 of the method 100, an updated anonymized version of the file is stored in the second memory. The updated anonymized version may be stored under version control, i.e., the previous anonymized version is not deleted from the second memory. The storing of the updated anonymized version may be performed without necessarily updating the information in the first memory, which remains valid; this fact advantageously makes it possible to limit the circle of staff entrusted with the processing of personal data.

Optionally, the step 134 affects data both in the first and the second memory. Assuming that it is desired to increase the brightness in a video sequence, this image processing operation may be applied to all frames of the video sequence and to all cropped images (i.e., extracted personal data items) in the first memory. The anonymized video sequence is saved as a new version in the version-controlled second memory, and new locators (Loc.m.n.2) which are stored on new rows in the data structure of the first memory are generated for the new version (v=2). Each new row includes the modified (brightened) cropped image but the same AnonID.m.n as the for the first version. This is made possible without detriment to the protection of the person's privacy.

Erasing Personal Data Associated with a Person

Figure 2:
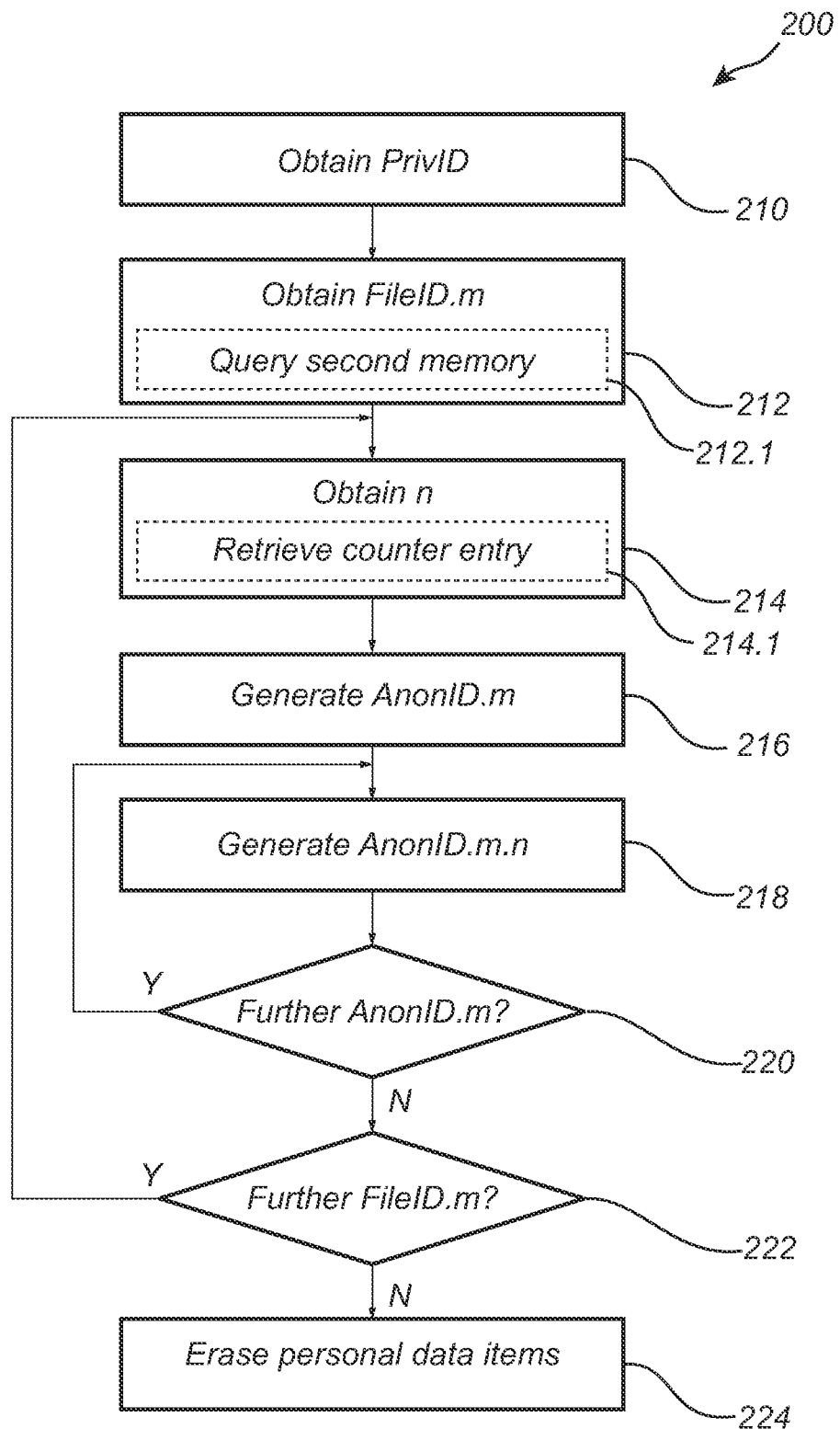
FIG. 2 is a flowchart of a method for erasing personal data associated with a person.

FIG. 2 illustrates in flowchart form a method 200 for erasing, from a first memory, personal data associated with a person. The method 200 is initiated at a point in time when the memory stores personal data items together with corresponding locators (Loc.m.n) and item-specific anonymous identifiers (AnonID.m.n) of persons associated with the personal data items; this content may have been loaded into the memory as a result of executing the method 100 for storing a file containing personal data described above.

The method 200 may for example be performed by or on behalf of a data recipient, a natural or legal person which had previously received or generated one or more files and had obtained the person's consent to store her personal data contained in the files. The method 200 for erasing the personal data associated with the person may be executed when the person requests 'to be forgotten' (to have her personal data erased) or, equivalently, when the person revokes the consent previously given.

In a first step 210 of the method 200, a private identifier (PrivID) of the person is obtained. Since the data recipient does not receive any private identifier (PrivID) from the person during a normal execution implementation of the method 100 for storing the file—such sharing would not improve the person's privacy—the step 210 will usually entail receiving the private identifier (PrivID) from the person or retrieving the private identifier (PrivID) from a shared memory to which the person grants the data recipient read access.

In a second step 212, tokens (FileID.m) of all files from which the personal data items may have been extracted are obtained. In this step 212, the data recipient may regenerate the tokens (FileID.m) in accordance with a rule and/or documentation relating to the storing of the one or more files in which the personal data was contained. Alternatively, the tokens (FileID.m) are received or fetched from a memory.

In principle, the person could maintain her own register of the tokens (FileID.m), which she shares with the data recipient in connection with the request for erasure; this will allow the person to restrict her request to a partial erasure, e.g., of personal data contained in files that were recorded on a particular date. If the data recipient is a professional entity, however, a more convenient option may be for the data recipient to store information sufficient to allow it to regenerate the tokens (FileID.m) exhaustively on its own, without any other input from the person than the private identifier (PrivID). The storage of this information should be at least as reliable and/or enduring as the storage of the private data, for if the information is lost, there is no longer any convenient way to perform selective deletion based on knowledge of the private data relating to a particular person. An attractive option, which can be practiced if the tokens (FileID.m) are based on filename, original file size, creation date or other file attributes, is for the data recipient to query a second memory, which stores anonymized versions of the files from which the personal data items have been extracted. Then, in a substep 212.1, the query may include a ls or dir command issued to the file system of the second memory, which will be successful for as long as the second memory stores the concerned files. Since the tokens derived from the output of the query will be matched against generated item-specific anonymous identifiers (AnonID.m.n) in a following step 224, it is a very small concern if the query to the second memory returns attributes of additional files which are unrelated to the person as a by-product.

In a next step 214, for each of the file tokens (FileID.m), identifiers (n) of all personal data items which are associated with the person and may have been extracted from the corresponding file or files are obtained. The obtention of these identifiers (n) may include retrieving them from a memory or other entity, or may be based on a regeneration process. The regeneration process may be controlled by the private identifier (PrivID) received from the person and may further depend on information stored in a memory maintained by the data recipient.

For example, the identifiers (n) of the personal data items to be erased may be obtained by executing a substep 214.1, in which a counter entry for the person is read. The concept of a counter entry was introduced above in connection with step 122 of the method 100 for storing, together with an example data structure that optionally includes a recognizable anonymous identifier (RecAnonID.m). To find the right counter entry for a file among multiple stored counter entries, the data recipient regenerates the recognizable anonymous identifier (RecAnonID.m) by first applying the one-way function to the combination of the private identifier (PrivID) and the token (FileID.m) of the file, which returns a temporary anonymous identifier (AnonID.m), and then applying the one-way function to the temporary anonymous identifier (AnonID.m). The data recipient matches the output of this operation with the relevant field (column) of multiple stored counter entries. Another field of the matching counter entry will represent the total number of personal data items, the first and last personal data item in a sequence determined by a predefined enumeration rule, a list of all the personal data items, or any of the other options listed under step 122. Accordingly, since one counter entry is expected for each temporary anonymous identifier (AnonID.m), substep 214.1 returns one set of identifiers (n) for each temporary anonymous identifier (AnonID.m).

To illustrate, it is assumed that the counter entry indicates an identifier ($n_a$) of the first personal data item and an identifier ($n_b$) of the last personal data item stored. Here, "first" and "last" refers to the enumeration sequence of the identifiers, not necessarily the points in time at which the personal data items were stored. In this case, the erasing method 200 applies an enumeration rule $n_{k+1}=f(n_k)$, which is identical or equivalent to a corresponding enumeration rule used in the storing method 100. By applying the enumeration rule to the identifier ($n_a$) of the first personal data item and then recursively to the successive outputs until the identifier ($n_b$) of the last personal data item has been reached, the data recipient may regenerate all identifiers. The identifier ($n_b$) of the last personal data item stored in the counter entry serves to verify the exhaustiveness of the enumerated identifiers. In variations of this regeneration process, the identifier ($n_a$) of the first personal data item may be pre-agreed or pre-specified. Further alternatively, a counter entry indicating the total number of identifiers will be as useful as knowing the identifier ($n_b$) of the last personal data item stored.

In a further step 216, temporary anonymous identifiers (AnonID.m) of the person are generated by applying a predefined one-way function to combinations of the obtained private identifier (PrivID) and the obtained file tokens (FileID.m). The one-way function is predefined in the sense that its action is equivalent to the one-way function which was used to generate the temporary anonymous identifiers (AnonID.m) when the file or files containing the personal data were stored.

As those skilled in the art will appreciate, steps 214 and 216 can be executed in any order, or in parallel. Since the temporary anonymous identifier (AnonID.m) generated in step 216 may be used as an input in substep 214.1, parallel execution may reduce the total number of times the one-way function has to be evaluated.

Next follows a step 218 of generating item-specific anonymous identifiers (AnonID.m.n) of the person, which proceeds by applying, for each generated temporary anonymous identifier (AnonID.m) of the person, the predefined one-way function to combinations of the temporary anonymous identifier (AnonID.m) and the obtained identifiers (n) of the personal data items. To ensure complete erasure, step 218 should generate a complete collection of those item-specific anonymous identifiers (AnonID.m.n) that have been used for storing personal data items associated with the person. If the identifiers (n) have been obtained using substep 214.1, there is one set of identifiers (n) for each temporary anonymous identifier (AnonID.m); it should then be sufficient to combine the identifiers (n) in one of these sets with the corresponding temporary anonymous identifier (AnonID.m), whereas combining with a different temporary anonymous identifier (AnonID.m') is unlikely to provide further item-specific anonymous identifiers that match any of the stored personal data items.

It is assessed in step 220 whether any more generated temporary anonymous identifiers (AnonID.m) of the person remain to be processed in step 218. If not (N branch), it is assessed in step 222 whether there is any further file token (FileID.m) that has been used to store personal data items associated with the person. If such further file tokens (FileID.m) are found to exist (Y branch), steps 214 onwards are re-executed for each further file token (FileID.m).

When all file tokens (FileID.m) have been processed, the method 200 proceeds to step 224, in which all such personal data items that match any of the generated item-specific anonymous identifiers (AnonID.m.n) of the person are erased from the first memory. The erasing may target the personal data items only, or the corresponding locators and/or item-specific anonymous identifiers may be deleted jointly. The latter option corresponds to deleting complete rows of the data structure illustrated by Table 1 above. If it is desired to locate the portions of the file from which personal data items have been extracted (e.g., for marking purposes), the locators should be left intact or recuperated in some other way, unless a copy of the locators has been stored elsewhere.

Reinstating Personal Data into a Stored File

Figure 3:
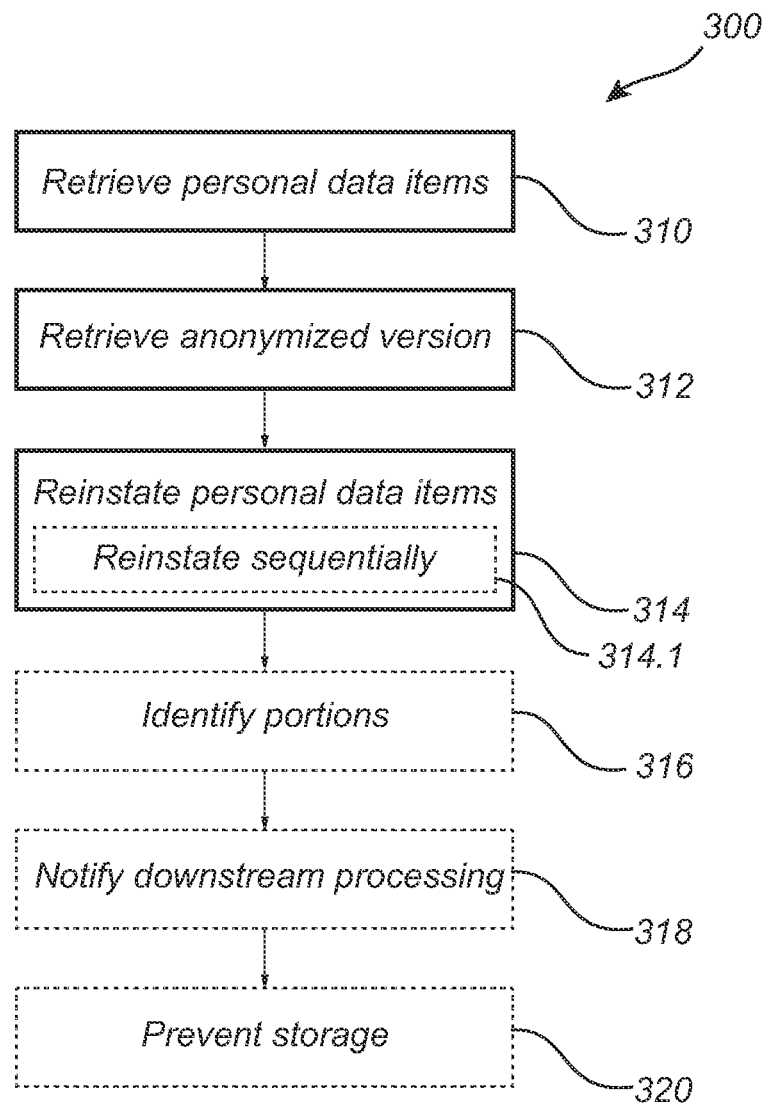
FIG. 3 is a flowchart of a method for reinstating personal data into a stored file.

FIG. 3 is a flowchart of a method 300 for reinstating personal data into a file. The method 300 is initiated at a point in time when a first memory stores personal data items together with corresponding locators (Loc.m.n) and item-specific anonymous identifiers (AnonID.m.n) of persons associated with the personal data items and when a second memory stores an anonymized version of the file. The memories may have received this content as a result of an execution of the method 100 for storing a file containing personal data described above. Since the time of storing the file, furthermore, the method 200 for erasing personal data associated with a person may have been executed, in which case the first memory now contains an incomplete collection of the personal data items that were extracted from the file when the storing method 100 was executed.

In a first step 310 of the method 300, those personal data items which have been extracted from said file and corresponding locators (Loc.m.n) are retrieved from the first memory. If the locators (Loc.m.n) have also been stored in a location other than the first memory, such as the second memory, they may equivalently be retrieved from there.

In a second step 312, the anonymized version of the file without the personal data items is retrieved from the second memory.

The personal data items are then reinstated, in step 314, into the anonymized version of the file in accordance with the corresponding locators (Loc.m.n). For example, a cropped area of a video frame corresponding to a person's face may be pasted back into the video frame, as indicated in the locator (Loc.m.n), which restores the video frame to an appearance similar to its original condition. The restored video frame may differ from the original condition if later versions of the file have been stored, e.g., as a result of image processing or video editing. Step 314 may entail a complete restoration of the file, namely, by reinstating all personal data items regardless of what persons they are associated with.

Substep 314.1 represents an advantageous way of executing step 314. Here, all retrieved personal data items are traversed sequentially and step 314 terminates after the last item. The substep 314.1 will execute robustly even when some or all of the personal data have been erased from the first memory, e.g., on request by the associated person, and it can be configured to return a usable (non-corrupted, readable, editable etc.) file with some remaining portions corresponding to the erased personal data items. The remaining portions may contain the output of any of removing, concealing, redacting, masking, replacing, overwriting, filtering and image processing that was applied in the execution of the storing method 100.

In an optional step 316, such portions of the anonymized version where a personal data item has been extracted but not reinstated are identified.

In a further optional step 318, a downstream utility processing step is notified of the portions which were identified in step 316. The identified portions may be understood as invalid or artificially modified data, as opposed to natural or representative data. For example, if the downstream processing includes training a machine-learning (ML) model, the identified portions may be excluded from the training data fed to the ML model. Alternatively, any updates the ML model derives from the identified portions (as represented, e.g., by a set of updated weights, or calculated gradients, or derived errors for a neural network) are deleted, neutralized, or rolled back to a previous value.

The file with the reinstated personal data items is kept in a runtime memory of a processor executing the method 300. To reinforce the privacy of the data subject, the method 300 may optionally include a final step 320 of taking action to prevent non-volatile storage of the file with the reinstated personal data items. Such action may include erasing the file in a runtime memory or overwriting it after it has been processed. Alternatively, the first and second memories and any available further non-volatile memories are provided with a gatekeeper functionality preventing storage of the file. Further alternatively, a cleanup based on dependency tracking techniques may be performed.

Device Implementations

FIG. 4 shows a device 410 which is communicatively connected to first and second memories 421, 422 and comprises processing circuitry 411 arranged to perform the storing method 100, the erasing method 200 and/or the reinstatement method 300. The processing circuitry 411 may contain application-specific or programmable circuits, or they may be implemented in a distributed manner using networked ('cloud') resources. The processing circuitry 411 may include a volatile runtime memory. Alternatively, the memory may be non-volatile and provided with a gatekeeper or covered by dependency tracking. The first memory 421 may be used to store extracted personal data items extracted from a file, locators, and item-specific anonymous identifiers. Since the first memory 421 is used for relatively sensitive content, it should preferably have a high resistance to intrusion attacks. Similarly, the communicative connection to the first memory 421, e.g., over a network, should be protected against eavesdropping. The second memory 422 may be used to store an anonymized version (or multiple anonymized versions) of the file. Both memories 421, 422 may be non-volatile memories. The second memory 422 may be subject to version control. The first memory 421 need not have version control.

FIG. 4 has been annotated with data labels illustrating how the storing method 100 may be executed. A file to be stored is supplied at the upper left side of the device 410. At the lower left side, a temporary anonymous identifier (AnonID.m) is supplied. The temporary anonymous identifier (AnonID.m) may have been generated by or on behalf of the person associated with the private data using a one-way function interface 490. As indicated, the one-way function interface 490 receives as input a private identifier (PrivID) of the person and is further modified in accordance with a file token (FileID.m), which the device 410 supplies. The person may use the one-way function interface 490 (illustrated in FIG. 4 as a further instance thereof) to generate the private identifier (PrivID) on the basis of a personal identifier (ID). On the basis of these inputs, the device 410 extracts the personal data items (symbolized as a rectangle and a circle in FIG. 4) from the supplied file and stores these together with corresponding locators (Loc.m.n) and item-specific anonymous identifiers (AnonID.m.n) in the first memory 421. The first memory may then contain triplets of personal data items, locators and identifiers. Parallel to this, the device 410 stores an anonymized version of the file in the second memory 422.

When the device 410 executes the erasing method 200, it may receive a private identifier (PrivID) of the requesting person, and it issues deletion commands to the first memory 421. When the device 410 executes the reinstatement method 300, it retrieves data from the first memory 421 and second memory 422 and outputs the reinstated file.

NUMBERED EMBODIMENTS

Embodiment 1. A method (100) for storing a file containing personal data, the method comprising:
obtaining (114) a temporary anonymous identifier (AnonID.m) of a person which temporary anonymous identifier (AnonID.m) is dependent on a token (FileID.m) of the file;
from the file, extracting (116) personal data items associated with the person;
for each personal data item, generating (118) a locator (Loc.m.n), which allows the personal data item to be reinstated into the file, and an item-specific anonymous identifier (AnonID.m.n) of the person, wherein the item-specific anonymous identifier is generated by applying a predefined one-way function to a combination of the temporary anonymous identifier (AnonID.m) and an identifier (n) of the personal data item; storing (120) each personal data item together with the locator and the item-specific anonymous identifier in a first memory; and storing (130) an anonymized version of the file without the personal data items in a second memory.

Embodiment 2. The method of embodiment 1, for further storing a second file containing personal data associated with the person, the method comprising:
obtaining (114) a second temporary anonymous identifier (AnonID.(m+1)) of the person, which temporary anonymous identifier (AnonID.(m+1)) is dependent on a token (FileID.(m+1)) of the second file;
from the second file, extracting (116) personal data items associated with the person; for each personal data item, generating (118) a locator (Loc.(m+1).n) and an item-specific anonymous identifier (AnonID.(m+1).n) of the person, wherein the item-specific anonymous identifier is generated by applying the one-way function to a combination of the second temporary anonymous identifier (AnonID.(m+1)) and an identifier (n) of the personal data item;
storing (120) each personal data item together with the locator and the item-specific anonymous identifier in the first memory; and storing (130) an anonymized version of the second file without the personal data items in the second memory.

Embodiment 3. The method of embodiment 1 or 2, further comprising:
obtaining (114) a temporary anonymous identifier (AnonID'.m) of a further person, which temporary anonymous identifier (AnonID'.m) is dependent on the token (FileID.m) of the file;
from the file, extracting (116) personal data items associated with the further person; for each personal data item, generating (118) a locator (Loc.m.n) and an item-specific anonymous identifier (AnonID'.m.n) of the further person, wherein the item-specific anonymous identifier is generated by applying the one-way function to a combination of the temporary anonymous identifier (AnonID'.m) and an identifier (n) of the personal data item; and
storing (120) each personal data item together with the locator and item-specific anonymous identifier in the first memory,
wherein the anonymized version of the file is stored in the second memory without the personal data items associated with the person and the personal data items associated with the further person.

Embodiment 4. The method of any of the preceding embodiments, wherein the second memory but not the first memory is subject to version control.

Embodiment 5. The method of any of the preceding embodiments, wherein the first and second memories are non-volatile.

Embodiment 6. The method of any of the preceding embodiments, wherein:
at least one of the personal data items is an area of an image; and
the locator (Loc.m.n) indicates the area in the image.

Embodiment 7. A method (300) for reinstating personal data into a file, the method comprising:
from a first memory storing personal data items, which have been extracted from files, together with corresponding locators (Loc.m.n) and item-specific anonymous identifiers (AnonID.m.n) of persons associated with the personal data items, retrieving (310) those personal data items which have been extracted from said file and corresponding locators;
from a second memory, retrieving (312) an anonymized version of the file without the personal data items; and
reinstating (314) the personal data items into the anonymized version in accordance with the corresponding locators.

Embodiment 8. The method of embodiment 7, wherein said reinstating includes sequentially reinstating (314.1) the retrieved personal data items and terminates after the last item.

Embodiment 9. The method of embodiment 7 or 8, further comprising:
identifying (316) such portions of the anonymized version where a personal data item has been extracted but not reinstated; and
notifying (318) a downstream utility processing step of the identified portions.

Embodiment 10. The method of any of embodiment 7 to 9, further comprising: acting (320) to prevent non-volatile storage of the file with the reinstated personal data items.

The aspects of the present disclosure have mainly been described above with reference to a few embodiments. However, as is readily appreciated by a person skilled in the art, other embodiments than the ones disclosed above are equally possible within the scope of the embodiments, as defined by the appended patent claims.

The invention claimed is:

1. A method for storing a file containing personal data, the method comprising:
   obtaining a temporary anonymous identifier of a person, wherein the temporary anonymous identifier is dependent on a token of the file;
   extracting from the file personal data items associated with the person;
   for each personal data item, generating a locator, which allows the personal data item to be reinstated into the file, and an item-specific anonymous identifier of the person, wherein the item-specific anonymous identifier is generated by applying a predefined one-way function to a combination of the temporary anonymous identifier and an identifier of the personal data item;
   storing each personal data item together with the locator and the item-specific anonymous identifier in a first memory; and
   storing an anonymized version of the file without the personal data items in a second memory.

2. The method of claim 1, further comprising:
   storing a counter entry for the person, which counter entry allows verification of exhaustiveness of an enumeration of all personal data items associated with the person.

3. The method of claim 2, wherein the counter entry includes a recognizable anonymous identifier of the person generated by applying the one-way function to the temporary anonymous identifier.

4. The method of claim 1, which is performed by a data recipient and further comprises:
making available a one-way function interface configured with said predefined one-way function to allow a person to generate the temporary anonymous identifier based on a combination of a private identifier and the token of the file without sharing the private identifier with the data recipient; and
optionally sharing the token of the file with the person or the one-way function interface.

5. The method of claim 4, wherein the one-way function interface is further configured to allow the person to generate the private identifier based on a personal identifier.

6. The method of claim 1, further comprising:
acting to prevent non-volatile storage of the temporary anonymous identifier.

7. The method of claim 1, further comprising:
removing the personal data items in the file by an anonymization operation including at least one of removing, concealing, redacting, masking, replacing, overwriting, filtering, image processing, to obtain said anonymized version of the file.

8. The method of claim 1, further comprising:
storing an updated anonymized version of the file in the second memory.

9. The method of claim 1, wherein:
at least one of the personal data items is an area of a frame in a video sequence; and
the locator indicates the frame in the video sequence and further indicates the area in the frame.

10. A method for erasing personal data associated with a person from a first memory where personal data items together with corresponding locators, which allow the personal data items to reinstated into a first file, and item-specific anonymous identifiers of the person, which are is generated by applying a predefined one-way function to a combination of a temporary anonymous identifier of the person and an identifier of the personal data item, associated with the personal data items were previously stored, the method comprising:
obtaining a private identifier of the person;
obtaining tokens of all files from which the personal data items may have been extracted;
for each one of the file tokens, obtaining identifiers of all personal data items which are associated with the person and may have been extracted from a corresponding file;
generating temporary anonymous identifiers of the person by applying a predefined one-way function to combinations of the obtained private identifier and the obtained file tokens;
for each generated temporary anonymous identifier of the person, generating item-specific anonymous identifiers of the person by applying the predefined one-way function to combinations of the temporary anonymous identifier and the obtained identifiers of the personal data items; and
erasing all personal data items from the first memory which match any of the generated item-specific anonymous identifiers of the person.

11. The method of claim 10, wherein the tokens of all files from which the personal data items may have been extracted are obtained by querying a second memory where anonymized versions of the files from which the personal data items have been extracted were previously stored, without the personal data items, comprising:
obtaining a temporary anonymous identifier of a person, which temporary anonymous identifier is dependent on a token of the file;
extracting from the file personal data items associated with the person;
for each personal data item, generating a locator, which allows the personal data item to be reinstated into the file, and an item-specific anonymous identifier of the person, wherein the item-specific anonymous identifier is generated by applying a predefined one-way function to a combination of the temporary anonymous identifier and an identifier of the personal data item;
storing each personal data item together with the locator and the item-specific anonymous identifier in a first memory; and
storing an anonymized version of the file without the personal data items in a second memory.

12. The method of claim 10, wherein the identifiers of all personal data items are obtained by retrieving a counter entry for the person.

13. The method of claim 12, further comprising:
enumerating identifiers of all personal data items which are associated with the person; and
verifying exhaustiveness of the enumerated identifiers on the basis of the retrieved counter entry.

14. A device communicatively connected to first and second memories and comprising processing circuitry arranged to perform a method for storing a file containing personal data, the method comprising:
obtaining a temporary anonymous identifier of a person, wherein the temporary anonymous identifier is dependent on a token of the file;
extracting from the file personal data items associated with the person;
for each personal data item, generating a locator, which allows the personal data item to be reinstated into the file, and an item-specific anonymous identifier of the person, wherein the item-specific anonymous identifier is generated by applying a predefined one-way function to a combination of the temporary anonymous identifier and an identifier of the personal data item;
storing each personal data item together with the locator and the item-specific anonymous identifier in a first memory; and
storing an anonymized version of the file without the personal data items in a second memory.

15. A non-transitory computer-readable storage medium having stored thereon a computer program for implementing a method for storing a file containing personal data when executed on a computer having processing capabilities, the method comprising:
obtaining a temporary anonymous identifier of a person, which wherein the temporary anonymous identifier is dependent on a token of the file;
extracting from the file personal data items associated with the person;
for each personal data item, generating a locator, which allows the personal data item to be reinstated into the file, and an item-specific anonymous identifier of the person, wherein the item-specific anonymous identifier is generated by applying a predefined one-way function to a combination of the temporary anonymous identifier and an identifier of the personal data item;

storing each personal data item together with the locator and the item-specific anonymous identifier in a first memory; and storing an anonymized version of the file without the personal data items in a second memory.

\* \* \* \* \*